(No Model.)
O. STERNOFF-BEYER.
WHEEL AND AXLE FOR VEHICLES.
No. 455,549. Patented July 7, 1891.
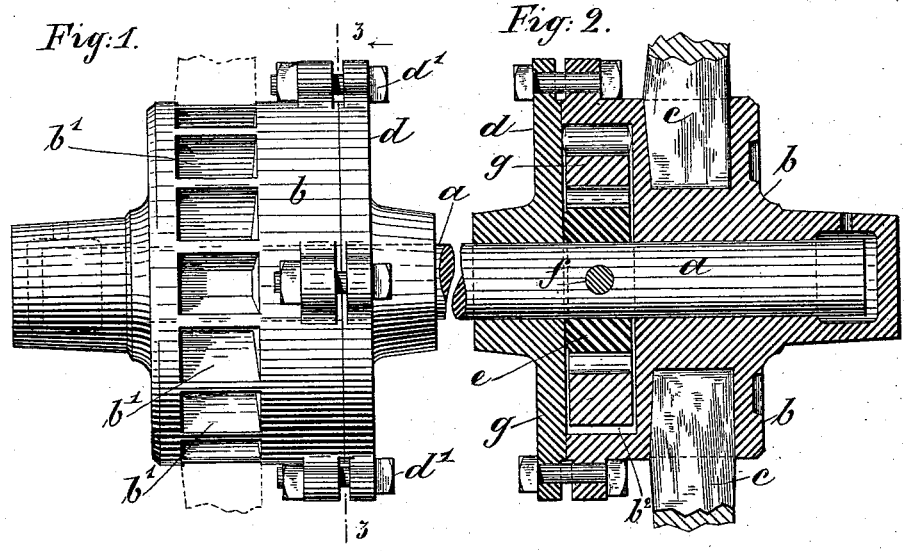
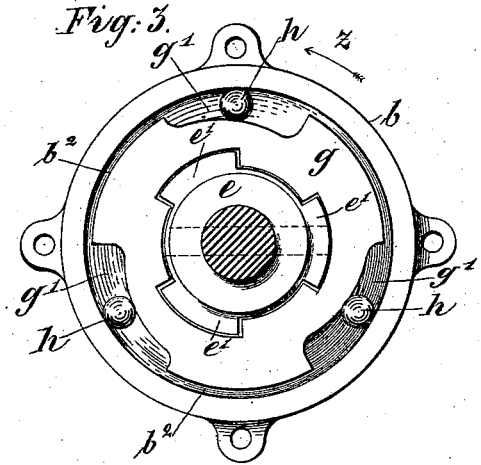
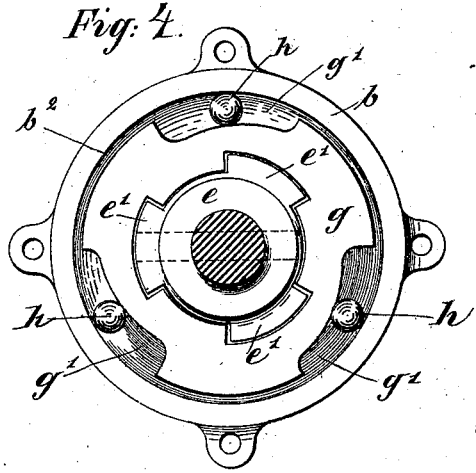
WITNESSES:
INVENTOR:
Otto Sternoff-Beyer,
By Henry Connett
Attorney.

UNITED STATES PATENT OFFICE.

OTTO STERNOFF-BEYER, OF CARLSTADT, NEW JERSEY, ASSIGNOR TO THE BROOKLYN RAIL WAY SUPPLY COMPANY, OF NEW YORK, N. Y.

WHEEL AND AXLE FOR VEHICLES.

SPECIFICATION forming part of Letters Patent No. 455,549, dated July 7, 1891.

Application filed February 25, 1891. Serial No. 382,745. (No model.)

*To all whom it may concern:*

Be it known that I, OTTO STERNOFF-BEYER, a citizen of the United States, and a resident of Carlstadt, in the county of Bergen and State of New Jersey, have invented certain Improvements in Wheels and Axles for Vehicles, of which the following is a specification.

My invention relates to the wheel-hub and axle of a vehicle of that class wherein the axle rotates and is driven by the ground-wheel when the vehicle is moving forward. Street-sweepers with rotary brooms belong to the class of vehicles referred to, and these sweepers as ordinarily constructed have their ground-wheels ratcheted on the axle in such a manner that in turning one wheel may stand or rotate backward while the other rotates forward and drives the axle. My invention relates to a device of this character so constructed as to permit of a reversal of the parts, whereby the same clutch device is adapted for use on either of the ground-wheels. This obviates the necessity of constructing duplicate parts.

My invention will be hereinafter fully described, and its novel features carefully defined in the claims.

In the accompanying drawings illustrating my invention, Figure 1 is a side elevation of a wheel-hub and part of the axle of a vehicle constructed according to my invention, and Fig. 2 is an axial section of the hub and clutch. These views merely show the hub of the wheel, the other portions thereof being of the usual kind and too common to require illustration. Fig. 3 is a transverse section on line 3 3 in Fig. 1; and Fig. 4 is a similar view illustrating the reversal of the clutch-ring, as will be hereinafter explained.

$a$ represents the axle, and $b$ the hub. This latter will be by preference a metal hub, with sockets $b'$ to receive the spokes $c$. Parts of two of the spokes are seen in Fig. 2. The hub has a recess $b^2$ in its inner face, and this recess is closed by a disk or plate $d$, which slips over the axle, and is secured to the face of the hub by bolts $d'$ or similar securing devices, whereby the hub and plate are made substantially one. They rotate together on the axle. The hub is stopped against endwise movement on the axle by a collar $e$, which occupies the recess in the hub and is secured to the axle. Herein the collar is represented as secured to the axle by means of a pin $f$, driven diametrically through the collar and axle; but any other equivalent securing device may be employed for the purpose. The collar $e$ has one or more, and preferably three, lugs $e'$, which loosely engage corresponding recesses in a clutch-ring $g$, which also occupies the recess in the hub and embraces the collar $e$, said collar and ring being preferably of about the same thickness as seen in Fig. 2.

In the periphery of the ring $g$, which may be a little less in diameter than the circular recess in the hub, are formed cam-recesses $g'$, preferably three, in each of which is placed a roller $h$, which may be of steel. This roller is of such a size with respect to the depth of the recess in which it is situated that when the hub is turned in the direction indicated by arrow $z$ in Fig. 3 the roller is driven or rolled forward by its peripheral contact with the inner face of the hub-recess and wedged in the shallower part of the cam-recess $g'$. Thus the ring $g$ is driven with the hub, and it in turn drives the axle. On the contrary, if the axle be rotated in the direction of arrow $z$ it carries with it the clutch-ring $g$, and the roller $h$ is thus made to enter the deeper rear part of the cam-recess $g'$, where it will be inert, and the wheel will not be rotated. In the same way backward rotation of the wheel does not effect rotation of the axle.

It will be obvious that if the collar $e$ and clutch-ring $g$ were integral and the parts nicely fitted the device would be operative; but I make these parts non-integral and fit them loosely together for reasons that I will now explain.

The hub $b$ is cast and left unfinished from motives of economy, and the inner curved surface of the recess in the hub, over which the roller $h$ rolls, is usually somewhat rough and uneven. The clutch-ring is also cast and left unfinished, and I find that it is desirable to leave said ring loose, as described, so that it may adjust itself the better to the rollers. Hence I make it to fit loosely over the lugs or projecting driving parts on the fixed collar $e$, which will also be somewhat rough exteriorly. This construction also enables me to use the same clutch-ring on either wheel of the vehicle, it being only necessary to reverse this ring with respect to the hub, as clearly illustrated in Figs. 3 and 4, the latter of which shows the ring reversed with respect to its position seen in Fig. 3.

The collar $e$ has a thickness substantially equal to the depth of the circular recess in the hub and is embraced between the hub and the disk $d$, which fits quite snugly about the axle. Thus the collar prevents endwise movement of the hub along the axle. The collar $e$ is simply an intermediary between the clutch-ring $g$ and the axle, and it may have almost any form so long as it performs the functions required of it.

The bottoms of the cam-recesses $g'$ are cam-surfaces on the periphery of the clutch-ring eccentric to the axle.

Having thus described my invention, I claim—

1. In a clutch device for a vehicle, whereby the ground-wheel is made to rotate the axle only in a forward direction, the combination, with an axle and a wheel-hub mounted rotatively thereon and provided with a circular recess $b'$, of a reversible clutch-ring occupying said hub-recess, rollers arranged between cam-surfaces on said ring and the inner periphery of the recess in the hub, and means, substantially as described, for loosely connecting the axle and said clutch-ring, whereby one is compelled to rotate with the other, as and for the purposes set forth.

2. The combination, with a vehicle-hub $b$, having in it a circular recess $b^2$, and a removable plate which closes said recess, of the axle, the collar fixed thereon and occupying the recess in the hub, the reversible clutch-ring $g$, also occupying the recess in the hub and having in it recesses engaged by projections on said collar, whereby said collar and ring are compelled to rotate together, and rollers arranged between cam-surfaces on the clutch-ring and the inner periphery of the hub-recess, as set forth.

3. The combination, with the axle, the wheel-hub mounted rotatively thereon and provided with a circular recess, and the removable plate or disk $d$, secured to the hub and closing said recess, of the collar $e$, fixed on the axle and occupying the hub-recess, said collar having a thickness substantially equal to the depth of said recess, the reversible clutch-ring $g$, loosely embracing said collar and having on it recesses engaged by projections on said collar, said ring having recesses in its periphery, as described, and the rollers $h$, occupying the recesses in said ring, as set forth.

In witness whereof I have hereunto signed my name in the presence of two subscribing witnesses.

OTTO STERNOFF-BEYER.

Witnesses:
HENRY CONNETT,
CHAS. A. WALSH.